April 29, 1969  H. H. McINTOSH  3,441,217

NONERODING ROCKET NOZZLE

Filed Nov. 16, 1966

INVENTOR.
HOWARD H. McINTOSH
BY
Thomas N Brennan

AGENT

United States Patent Office 3,441,217
Patented Apr. 29, 1969

3,441,217
NONERODING ROCKET NOZZLE
Howard H. McIntosh, Brigham City, Utah, assignor to Thiokol Chemical Corporation, Bristol, Pa., a corporation of Delaware
Filed Nov. 16, 1966, Ser. No. 594,823
Int. Cl. B64d 33/04; B05b 9/00
U.S. Cl. 239—265.15                  4 Claims

ABSTRACT OF THE DISCLOSURE

A rocket motor and nozzle wherein a refractory material insert is bonded to the nozzle interior surfaces and a thin sheet of refractory metal is disposed in the refractory material so as to materially enhance the erosion resistance qualities thereof.

---

Figure 1:
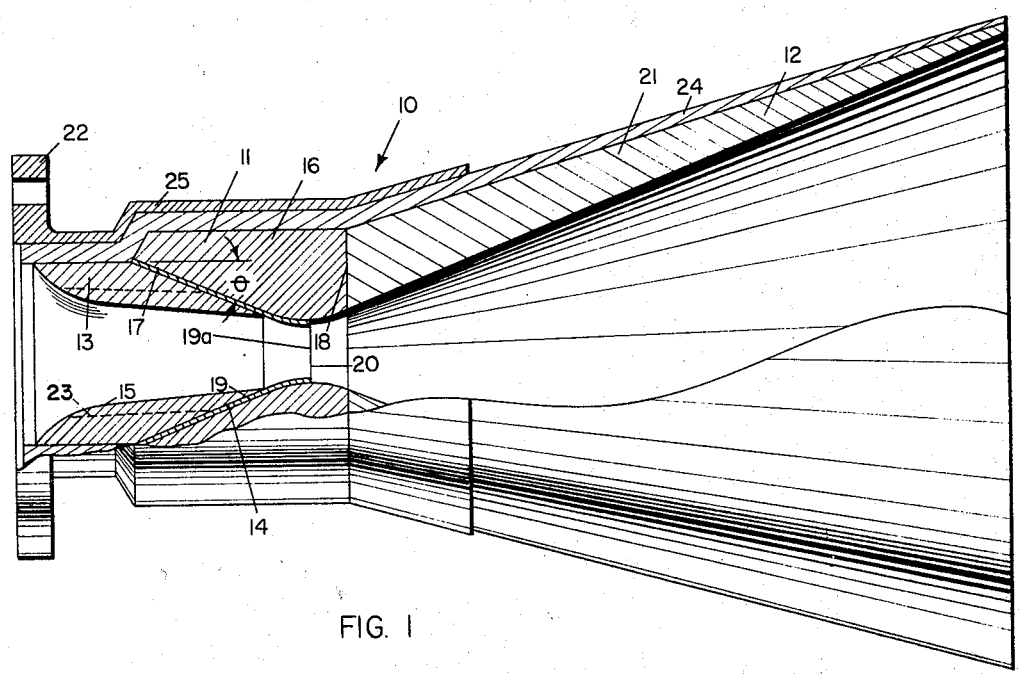

This invention relates to nozzles for rocket motors and the like. More particularly, it relates to unique means for enhancing erosion resistance of rocket thrust nozzles.

Heretofore, the best erosion resisting, i.e., "noneroding," nozzle throat inserts have been manufactured by metal spinning and/or forging techniques using metals such as tungsten, tantalum, molybdenum, and the like.

In other instances inserts have been made from graphite and/or ceramics such as metal oxides, borides, silicides, nitrides and carbides wherein the metal constituents are aluminum, chromium, magnesium, zirconium, titanium, molybdenum, tungsten and tantalum and in yet other instances composite materials known as cermets which consist of intimate mixtures of the ceramics exemplified above and additional metallic components including those noted and others such as nickel, cobalt, iron, stainless steel, Inconel metal, Hastelloy, Vitalium, silver, platinum and beryllium.

However, while the above noted nozzle inserts have performed well to date, the advent of very large motors now contemplated in single nozzle solid propellant rocket boosters practically precludes the use of refractory metals since spinning and forging of such large one piece structures of tungsten, molybdenum and tantalum is largely impossible or performed, if at all, with great technical difficulty.

Accordingly, it is one object of this invention to provide a throat or throat insert for a rocket motor booster which is capable of resisting erosion due to the high temperature gases produced therein, by utilizing present day state-of-the-art metal forming techniques.

It is another object of this invention to provide a nozzle insert of the type described wherein a metal welding technique is utilized to form a major portion thereof.

Still another object of this invention is to provide a motor insert of the character noted wherein a metal erosion barrier is combined with a non-metal base material to form the nozzle throat in a very large rocket booster motor.

A still further object of this invention is to provide a throat insert for a rocket booster motor of large diameter wherein an erosion barrier consisting of a sheet of tungsten, tantalum, titanium, and/or molybdenum is end-joined by welding in a frusto-conical form and oriented in a non-metal base material in a particular manner.

Other objects and advantages of the invention will become readily apparent as the same becomes better understood by reference to the following detailed description when considered in connection with the accompanying drawings wherein the same characters are used to designate identical parts throughout the views.

Figure 2:
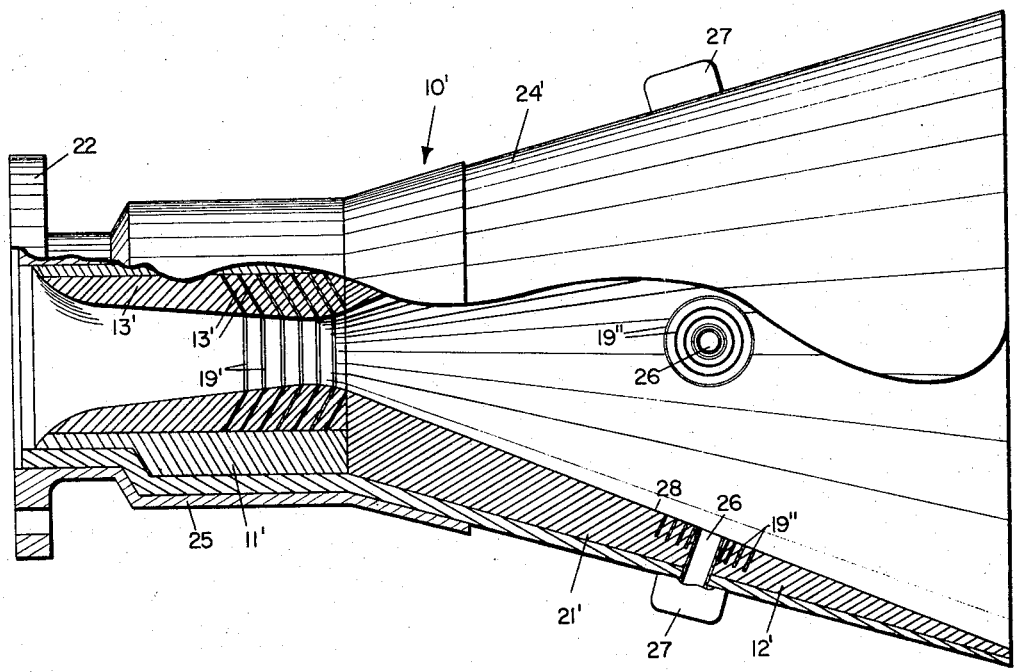

In the drawings:

FIGURE 1 is a partially-sectional side elevation of a rocket thrust nozzle embodying the preferred form of the invention; and FIGURE 2 is similar to FIGURE 1, but shows an alternate embodiment of the invention.

Referring to FIGURE 1, a preferred form of the invention depicted therein comprises a nozzle assembly 10 having an outer metal case or shell 24 surrounding a throat section 11 and an expansion cone 12. Shell 24 is supported in the region where it encloses throat section 11 by an outer reinforcing jacket or shroud 25 having an integral mounting flange 22. Throat section 11 includes an insert retaining member or piece 13 fitted at its outer periphery to the inside wall of shell 24 by adhesive bonding. Retaining member 13 has a machined aft or downstream face 14 and an annular upstream or forward face 15 which converges aftwardly. An annular base member or throat piece 16 is also attached to the inside wall of shell 24 by adhesive bonding and has a machined forward or upstream face 17 and an aft or downstream face 18 which abuts a liner 21 in expansion cone 12.

Faces 14 of retainers 13 and 17 of base 16 are angularly machined so that when installed in shell 24 they are in parallel relation and separated by an erosion barrier or insert 19. Barrier or insert 19 is formed with sloping sides in frusto-conical shape of refractory metal such as tungsten, molybdenum, tantalum or titanium and is positioned between faces 14 and 17, with its smaller or minor diameter downstream forming throat 20. As shown in FIGURE 1, insert 19 is of frusto-conical shape having an angle designated by the Greek letter theta ($\theta$), preferably ranging from about 15° to about 20°, between its sloping slide and a line parallel to the axis of the nozzle 10.

Insert 19 is the heart of this invention and is easily fabricated using current forming techniques well known in the art. For instance, insert 19 can easily be made from tungsten rolled sheet, which is commercially available in thicknesses ranging from about 0.100 inch to 0.250 inch. In a specific example a sheet of rolled tungsten, a sheet having a thickness of 0.150 inch, was cut into a ribbon in suitable dimension and its ends joined and welded, resulting in the frusto-conical shape shown and positioned on surface or face 17 of base 16 by adhesive bonding. Retaining piece 13 is then placed in the conical portion of insert 19 with face 14 bearing against the inside surface thereof by adhesive bonding. Insert 19 is arranged between retainer 13 and base 16 with a small end portion 19a extending from refractory material retainer 13 and base 16 to form throat 20. Nozzle 10 is completed by installation of liner 21 in expansion cone 12 after which it is installed on a rocket motor (not shown) by conventional bolting by means of attaching flange 22.

It is seen then that by means of installation in shell 24 of refractory retainer 13, base 16, and liner 21 in expansion cone 12, a converging-diverging passage is thereby formed with throat 20 defined by end portion 19a of insert 19.

Material selected for retainer 13, base 16, and liner 21 is preferably graphite, although other materials such as the ceramics and cermets above mentioned are also suitable depending on operating motor conditions. Many plastice resins including the phenolics, silicones, malonates, polyesters, melamines, polyamides, epoxies and the ureas, with or without filler materials such as asbestos, and cotton, wool and nylon flock and the like may also be used for specific applications.

In operation of the invention, upon ignition of the motor having nozzle 10 attached, high temperature gases are generated which, depending upon the composition of the propellant combusting in the motor, will tend to cause more or less erosion of the internal portions thereof. It has been found however, that throat 20 formed by the aft or downstream portion 19a of barrier 19 can successfully withstand erosion from these motor gases and thus remains dimensionally stable when fabricated of tungsten, molybdenum or tantalum. Other high strength, high temperature resisting materials including stainless steel, nickel, certain other alloys including Inconel metal and the like can, in some applications, also be utilized to good effect. Such erosion as does occur is confined to the convergent surface 15 of retainer 13 and is represented by dash line 23 in FIGURE 1. However in all practical respects the internal dimensional integrity of nozzle 10 is preserved. Operationally, no significant detrimental effects are discernable.

FIGURE 2 illustrates an alternate embodiment of the invention, for use in rockets having extremely erosive propulsive gases. It is essentially the same as the embodiment of FIGURE 1, except that a series of refractory members 19' similar to erosion barrier 19 is used in places of otherwise heavy erosion. Accordingly, all parts of the nozzle 10' are identical to those described for nozzle 10 except that outer shell 24', liner 21', retaining members 13' and erosion barrier 19' are all modified relative to their counterparts 24, 21, 13, and 19, respectively. The outer shell 24' and liner 21' are perforated to receive four tubes 26, equally spaced circumferentially in the expansion cone 12. The tubes 26 are used for selectively injecting a pressurized fluid from a source (not shown) into the expansion cone via pipes 27 to divert the propulsive gases and, thereby, steer the rocket. A series of annular, successively-larger-diameter erosion barriers 19" embedded in the liner 21' surrounds each tube 26 at the interior surface 28 of expansion cone 12' to protect these orifices from erosion. The forward retaining member 13 is divided into a plurality of annuli 13' having conical surfaces alternately arranged with a tandem series of erosion barriers 19' similar to the erosion barrier 19 of FIGURE 1. The erosion barriers 19' and retaining members 13' function in a manner identical to members 13 and 19 of FIGURE 1 and are similarly fixed to adjacent parts by adhesive bonding.

As hereinbefore indicated, what has been presented to the art of rocket motors, more specifically, very large motors most useful as space boosters and the like, is a means for simplifying the fabrication of the extreme size throat inserts wherein noneroding characteristics are required. While prior throat inserts in motors having throat diameters on the order of four inches or less, forging and spinning techniques proved more than adequate to accomplish the desired end, it becomes impractical to attempt such methods for nozzle motors having greater diameter throats, hence inserts having the desirable capabilities of the metal materials described lose their attractiveness, and other less desirable ones substituted. With the invention herein, however, these materials again continued and broadened use where otherwise they would in all likelihood, have been discarded or at best confined to use in small motors.

What has been invented then and presented to the art of rocket motors in general and nozzle throats in particular is a novel insert or erosion barrier therefor which finds preferred use in very large motors having throat diameters of a magnitude of four inches and greater. No other limitations regarding the scope of the invention is intended except as indicated by the scope and language of the subtended claims.

What is claimed is:

1. In a rocket motor of the type comprising an outer shell and refractory material fixed to the inner surfaces thereof, said refractory material internally contoured to define a converging-diverging passage therethrough, the improvement comprising:

at least one refractory metal insert formed from a ribbon of thin sheet metal stock and rolled to a frusto-conical shape, said insert disposed in said refractory material around said passage having its base portion upstream and its top portion downstream, said top portion emerging from said material and terminating in a plane proximate the throat of said nozzle.

2. The rocket motor nozzle of claim 1 wherein the refractory metal of said insert is selected from the group consisting of tungsten, molybdenum, tantalum, stainless steel, Inconel metal, nickel and alloys thereof.

3. The rocket nozzle of claim 1 wherein the diverging portion of said refractory material and said shell, has at least one perforation therethrough, a tube in said perforation defining an orifice for injecting fluid into said converging portion of said nozzle, and a plurality of annular, substantially concentric refractory metal erosion barriers embedded in said refractory material surrounding said tube.

4. The rocket nozzle of claim 3 wherein the refractory metal of said erosion barriers is selected from the group consisting of tungsten, molybdenum, tantalum, stainless steel, Inconel metal, nickel and alloys thereof.

References Cited

UNITED STATES PATENTS

| | | | |
|---|---|---|---|
| 3,048,972 | 8/1962 | Barlow | 239—265.15 |
| 3,073,111 | 1/1963 | Hasbrouck | 239—265.15 |
| 3,147,590 | 9/1964 | Thielman | 239—265.15 |
| 3,153,320 | 10/1964 | Prosser | 239—127.3 |
| 3,157,026 | 11/1964 | Lampert | 239—127.1 |
| 3,248,874 | 5/1966 | Grina | 239—265.15 X |
| 3,253,785 | 5/1966 | Watanabe | 239—265.15 |
| 3,282,421 | 11/1966 | Prosser et al. | 239—127.3 |

EVERETT W. KIRBY, *Primary Examiner.*

U.S. Cl. X.R.

239—1, 127.3